W. B. BISHER.
DOUBLETREE SUPPORT.
APPLICATION FILED AUG. 11, 1916.
1,210,890. Patented Jan. 2, 1917.
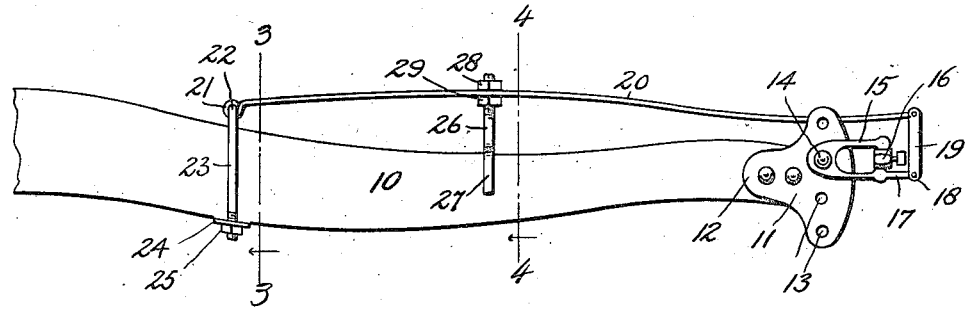
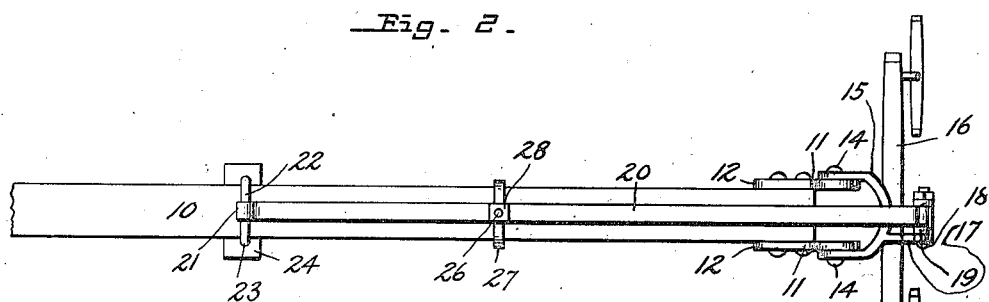
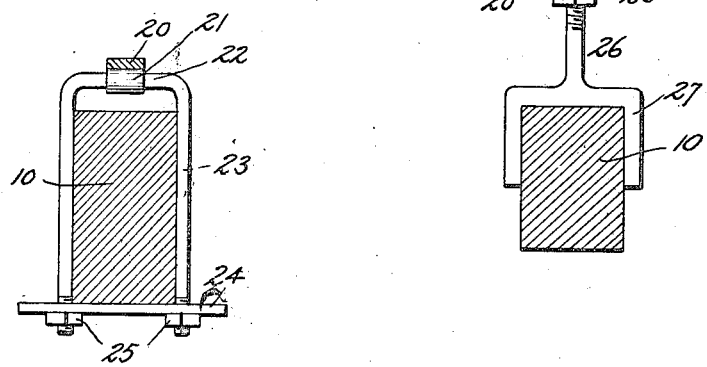
WITNESSES
INVENTOR
William B. Bisher
BY
ATTORNEY

UNITED STATES PATENT OFFICE.

WILLIAM B. BISHER, OF TAYLOR, NEBRASKA.

DOUBLETREE-SUPPORT.

1,210,890.

Specification of Letters Patent.

Patented Jan. 2, 1917.

Application filed August 11, 1916. Serial No. 114,452.

*To all whom it may concern:*

Be it known that I, WILLIAM B. BISHER, a citizen of the United States, residing at Taylor, in the county of Loup and State of Nebraska, have invented certain new and useful Improvements in Doubletree-Supports, of which the following is a specification.

This invention relates to doubletree supports, and has for its object to provide a support for attachment to a plow beam or like implement or to a vehicle for resiliently supporting a doubletree and preventing the same from swinging downwardly by its own weight when released from the animals. This support resiliently maintains the doubletree in operative position and away from any interference with the animals during a pause or halt in the field.

With this as the principal object in view and other objects in details to be developed in the course of the following description, the invention consists of the novel construction, combination, and arrangement of parts now to be set forth and illustrated in the accompanying drawing, in which—

Figure 1 is a side elevation of the forward end of a plow beam with the doubletree support secured in place thereon; Fig. 2 is a top plan view of the same; Fig. 3 is a vertical cross sectional view on the line 3—3 of Fig. 1; and Fig. 4 is a similar view on the line 4—4 of the same figure.

In the drawings 10 indicates a plow beam, at the forward end of which is bolted or riveted on each side a clevis plate 11, said bolt extending through the rearward extensions 12 of said plate, and is extended above and below the beam and provided with a series of perforations 13, through any one of which passes the fastening bolt 14 of a clevis 15, the forward end of which clevis is pivotally connected to a doubletree 16. An arm 17 extends from the clevis 15 in a forward direction beyond the doubletree, and has a socket on its forward end through which passes a horizontal bolt 18 for pivotally connecting to said arm two vertically disposed links 19, one on each side of said bracket, said links at their upper ends being connected to the forward end of a leaf spring 20 which may be flat, and has a compound curve therein between its forward and rear ends as shown in the drawing. The opposite or rear end of the spring 20 is formed into a loop or eye 21, which embraces the horizontal portion or base 22 of a U-shaped loop or yoke 23, the legs of which extend downwardly on opposite sides of the plow beam, and at their lower ends pass through openings in a plate 24 that extends across the plow beam on its under side and by means of nuts 25 threaded on the ends of the loop 23 the yoke and rear end of the spring are held in place on the plow beam.

For the purpose of adjusting the tension of the spring 20 and the position of the doubletree relative to the forward end of the plow and the clevis pivot 14 there is placed between the ends of the spring a support 26, the lower end of which is forked, as at 27, to straddle the top of the plow beam (see Fig. 4) and is threaded at its upper end which passes freely through a perforation in the spring 20 and is secured to said spring by nuts 28 and 29 on the upper and lower sides of the spring, respectively. By turning these nuts, it is evident that the tension of the spring may be adjusted and said spring may also be caused to tilt about its pivotal point at the loop 21 so as to raise and lower its outer end and thus elevate or depress the doubletree 16.

What I claim is:

1. The combination with a plow beam or equivalent member of a clevis pivotally connected to the forward end thereof for supporting a doubletree, a spring plate extending over said plow beam and secured thereto at one end and at its other end to said clevis, and means between the ends of the spring and bearing upon said plow beam for varying the tension of said spring and the vertical position of said doubletree.

2. The combination with a plow beam or equivalent member, of a leaf spring extending longitudinally thereof and above the same, means connecting the rear end of said spring to the plow beam, a clevis pivotally connected to the forward end of said beam and supporting a doubletree, connecting links between the clevis and the forward end of said spring, and a tensioning and position changing device for said spring acting thereon between its ends.

3. The combination with a plow beam, a clevis pivotally connected to its forward end for supporting a doubletree, a flat leaf spring extending longitudinally of the plow beam above the same, a loop pivotally connected to the rear end of said spring and rigidly connected to the plow beam, links between the forward end of the spring and said clevis for connecting the latter to the spring, and a tensioning device for said spring adjustably secured between the ends thereof and adapted to bear on the top of the plow beam.

4. The combination with a plow beam of a spring extending longitudinally above the same, a loop connected to said beam and to an eye formed on the rear end of said spring, a clevis pivotally connected to the forward end of the plow beam and adapted to hold a doubletree, an arm projecting forwardly from said clevis and beyond the doubletree, links between said arm and the forward end of the spring to maintain said doubletree in operable position, and a device for tensioning the spring adjustably secured thereto and adapted to bear upon the top of the plow beam.

In testimony whereof I affix my signature in presence of two witnesses.

WILLIAM B. BISHER.

Witnesses:
  D. D. Cheesman,
  A. E. Woods.